April 1, 1952   G. ELLIS   2,591,345
DIRECT CURRENT AMPLIFIER WITH SYNCHRONIZED
CHOPPER AND RECTIFIER WITH PHASE SENSE
Filed June 1, 1950   2 SHEETS—SHEET 1
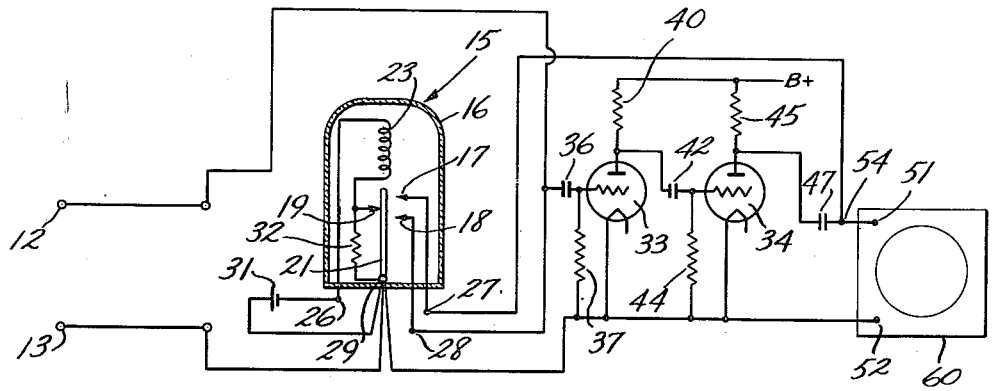
FIG. I.
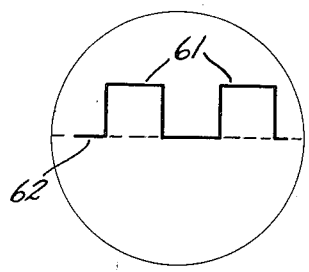
FIG. 2.
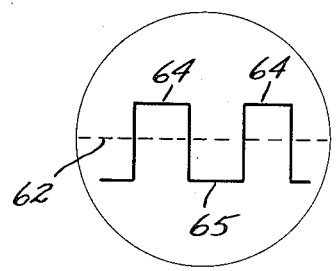
FIG. 3.
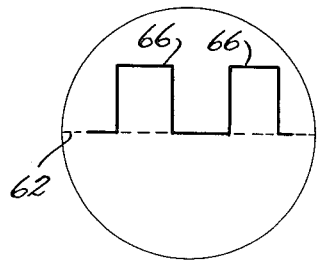
FIG. 4.
INVENTOR
Green Ellis
BY Emery Varney,
Whittemore & Dix
ATTORNEY April 1, 1952 G. ELLIS 2,591,345
DIRECT CURRENT AMPLIFIER WITH SYNCHRONIZED
CHOPPER AND RECTIFIER WITH PHASE SENSE
Filed June 1, 1950 2 SHEETS—SHEET 2
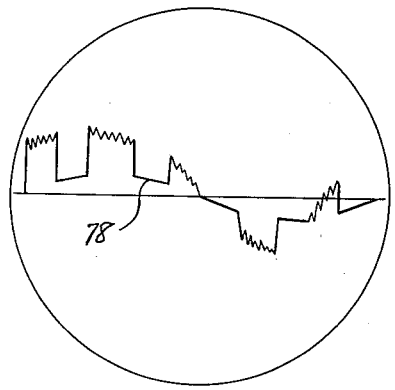
FIG. 5.
FIG. 6.
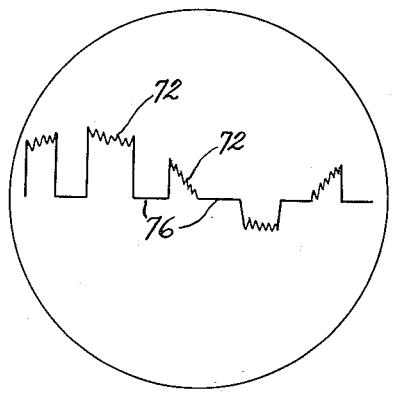
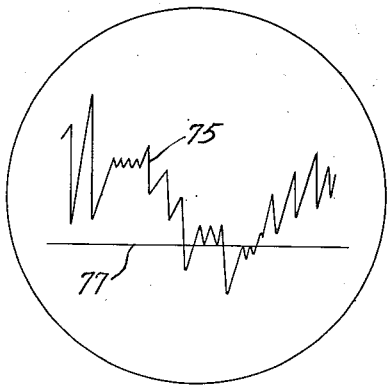
FIG. 7.
INVENTOR
Greer Ellis
BY
ATTORNEY Patented Apr. 1, 1952

2,591,345

UNITED STATES PATENT OFFICE 2,591,345

DIRECT CURRENT AMPLIFIER WITH SYNCHRONIZED CHOPPER AND RECTIFIER WITH PHASE SENSE

Greer Ellis, Pelham, N. Y.

Application June 1, 1950, Serial No. 165,527

7 Claims. (Cl. 315—26)

1

This invention relates to apparatus for amplifying a direct current input that may be either steady or variable, and for producing a higher voltage output current that is an overall direct current.

It is an object of this invention to provide an improved amplifier that obtains linear proportion and phase sense with faithful reproduction of signals over a wide range of frequency without phase distortion.

Another object is to provide a simplified direct current amplifier that uses an alternating-current amplifier unit in a circuit with switch means which short circuits both the input and the output of the amplifier unit, to produce a synchronized rectification that gives an overall direct current amplification, which is especially useful for operating an oscillograph. Further it will actuate a direct current meter in true proportion to the feeble direct current voltage being measured.

Another object of the invention is to combine an oscillograph with amplifier apparatus having an improved circuit that gives an oscillograph image with a true zero line and phase sense. The term "oscillograph" is used herein in a broad sense to indicate either a cathode ray type of impulse indicating instrument whether equipped with a screen or photographic strip and whether constructed with a sweep ray or a moving sensitized strip of film or paper or any other type of varying voltage indicating or recording devices. The invention will be described in combination with an oscillograph having a sweep ray and a screen.

One advantage is that the alternating current amplifier unit used in this invention is more stable than a direct current unit and gives better results, therefore, with the small currents available from strain gages and other equipment that requires a high amplification factor to obtain power enough to operate an oscillograph.

Other objects, features and advantages of the invention will appear or be pointed out as the description proceeds.

In the drawing, forming a part hereof, in which like reference characters indicate corresponding parts in all the views, Figure 1 is a diagrammatic illustration of an oscillograph combined with alternating-current amplifier apparatus that receives direct current signals and amplifies them to operate the oscillograph without loss of phase sense and with an overall direct current output.

Figures 2, 3 and 4 are diagrams showing the waves produced by the signals at different parts of the apparatus shown in Figure 1.

The apparatus includes input terminals 12 and 13 that are connected to any source of direct current voltage which is to be amplified, but is intended primarily for feeble voltages such as are received from strain gages. Some other devices from which power is amplified by this invention are thermo-couples, and photo-electric cells. These devices are mentioned merely by way of illustration and it will be understood that the invention can be used for amplifying voltages from other sources.

There is a vibrator switch 15 in the circuit. This vibrator switch includes a housing 16 within which there are three contacts 17, 18 and 19, and a single reed 21. The contact 19 is on the opposite side of the reed from the contacts 17 and 18, and the reed 21 has a bias that urges it into a position in which it touches the contact 19. A motor coil 23, within the housing 16, is connected on one side to the contact 19, and the other side of the motor coil 23 is connected with a terminal 26 of the vibrator switch.

The contacts 17 and 18 are connected with terminals 27 and 28, respectively, of the vibrator switch; and the fixed end of the reed 21 is connected with a terminal 29 of the switch. A battery 31 connected across the terminals 26 and 29 supplies power to the motor coil 23 when the reed 21 is in the position shown in the drawing. A resistor 32, connected in parallel with the reed 21 between the contact 19 and the terminal 29, eliminates electrical noise that would otherwise be generated by the repeated making and breaking of the motor coil circuit.

The motor coil 23 is in position to attract the reed 21 away from the contact 19 and into position to touch the contacts 17 and 18. However, as soon as the reed 21 is pulled away from the contact 19, the circuit through the motor coil 23 is broken and the reed 21 is, therefore, vibrated back and forth between the contact 19 at one end of its stroke and its contacts 17 and 18 at the other end of its stroke. The operation of such vibrator switches are well known in the art.

The circuit shown in the drawing includes also an alternating current amplifier unit comprising two electronic tubes 33 and 34 connected so as to provide two stages of amplification of the power supplied to the input terminals 12 and 13. The first stage is obtained from the tube 33 which has its grid connected with the terminal 12 through a blocking condenser 36 and suitable conductors. The cathode of the tube 33 is connected with the terminal 13, and there is a grid-leak 37 connected across the circuit in accordance with conventional practice.

The voltage acting in the plate circuit of the tube 33 is coupled to the grid of the second tube 34 by a resistance 40, and there is a blocking condenser 42 connected between the grid of the tube 34 and the plate of the first tube 33.

The tube 34 has a grid leak 44, and has its plate circuit connected with a resistance 45, in the B battery circuit, and a blocking condenser 47 in a circuit that leads to output terminals 51 and 52 of the amplifier apparatus.

The contact 17 of the vibrator switch 15 is connected with the terminal 51 at a connection 54 beyond the last condenser 47 of the amplifier unit. The terminal 28 of the vibrator switch 15 is connected in the circuit with the input terminal 12 ahead of the first condenser 36 of the amplifier unit. With these shunt circuits, it will be apparent that when the vibrator switch 15 is operating as a chopper, both the input and output of the amplifier unit are short circuited when the reed 21 touches the contacts 17 and 18 to establish a circuit between these contacts 17 and 18 and the ground terminal 13. Since the reed 21, through its terminal 29, is connected with the other input terminal 13, the terminals 12 and 13 are themselves short circuited whenever the reed 21 touches the contact 17, and likewise the output terminals 51 and 52 are short circuited simultaneously with these input terminals 12 and 13.

The output terminals 51 and 52 of the amplifier apparatus are connected with a cathode-ray oscillograph 60 of the type capable of displaying direct-current as well as alternating current signals. If the signals supplied to the input terminals 12 and 13 are not sufficiently strong to drive the oscillograph 60 with only two stages of amplification, then the amplifier unit can be made with more stages of amplification.

The direct current unit supplied to the terminals 12 and 13 may be constant or variable. If it is constant, it will be chopped into waves by the vibrator switch 15 so that the input to the amplifier unit will be variable regardless of whether the electrical energy supplied to the terminals 12 and 13 is constant or variable.

Figure 2 shows the voltage input to the first stage of the amplifier unit. There are waves 61 formed by the operation of the vibrator switch which drops the input voltage to a zero line 62 each time that the vibrator short circuits the input circuit. If the input is variable, the vibrator switch 15 will produce waves which are of different amplitude from one another.

Figure 3 shows the effect produced within the amplifier unit by the input voltage illustrated in Figure 2. An alternating-current signal is produced with plus and minus lobes 64 and 65 symmetrical about a zero line 62 of the tube. It will be apparent that phase sense has been lost, and the plus and minus portions of the wave are the same. In practice, these can sometimes be distinguished by irregularities resulting from harmonics on either the plus or minus portions of the wave, depending upon which side of the vibrator switch the contacts are located. The image shown in Figure 3 is the image that would be seen on the oscillograph screen without the short-circuiting feature of this invention.

Figure 4 shows the image that is actually shown on the screen of the oscillograph 60 as a result of the operation of this invention. The zero line 62 is restored to its proper place and the amplified signal waves 66, corresponding to waves 64, have correct phase sense.

Steady state signals of any frequency will be virtually undisturbed by the operation of the synchronized chopper and rectifier. Figure 6 shows the condition when a steady state signal 72 is of lower frequency than that of the chopper; while Figure 7 displays signals 75 of higher frequency than the chopper. In Figure 6 each cycle of operation of the chopper is distinctly seen because the oscillograph sweep is synchronized with a sub-multiple of the chopper frequency. The zero line 76 chopped in by the vibrator switch or chopper is intermittent.

The zero line 77 is observed as a complete line in Figure 7, however, because the oscillograph sweep is not synchronized with the chopper and persistence of vision adds together images formed during each cycle of operation of the chopper.

By way of illustrating the usefulness of the synchronized shorting of the output simultaneously with the input, Figure 5 shows the result that is obtained with a chopper for the input only connected through the same alternating current amplifier as in the illustration of Figure 6 and displaying a signal of sufficiently low frequency to be in the range of or below the time constant of the alternating current amplifier. Because of the time constant of the amplifier the zero line 78 that is chopped in does not remain flat. Adding the synchronized shorting of the output of the alternating current amplifier restores the true zero line 78, as shown in Figure 6, regardless of time constant of the alternating current amplifier.

The improved results obtained with this invention require the short-circuiting of the input and output circuits by the contacts 17 and 18 in phase, or 180° out of phase. For example, the contacts 17 and 18 might be located on opposite sides of the reed 21. It is not necessary that the vibrator switch 15 have only a single reed, but it is an advantage of the invention that it can be used with simple, single reed vibrator switches.

The frequency of operation of the vibrator switch should be low enough so that the constants of the circuits do not distort the waves produced by the short-circuiting of the input and output of the amplifier unit. The vibrator switch is merely representative of switch means for opening and closing the circuits in accordance with a regular cycle.

The preferred embodiment of this invention has been illustrated and described, but changes and modifications can be made without departing from the invention as defined in the claims.

What is claimed is:

1. Amplifier apparatus comprising a circuit with input terminals, an alternating-current amplifier unit connected across the input terminals, an output circuit from the amplifier unit, switch means with contacts that are connected with the respective input terminals and contacts that are connected with the opposite sides of the output circuit, said switch means including also conductor means movable into one position where they touch all of said contacts simultaneously and thereby to short circuit both the input terminals and said output circuit, and motor means that move the switch into and out of said position at a predetermined frequency.

2. An amplifier apparatus of the type including electronic tubes providing a plurality of stages of amplification with a blocking condenser ahead of at least one of the stages and with input and output circuits for the amplifier, the combination with said circuits of a switch having contacts that short circuit the respective circuits when the switch is in a predetermined position and means for moving an element of the switch to and from both of said contacts, said means including a motor that moves the switch element in accordance with a predetermined frequency.

3. Amplifier apparatus comprising an electronic tube amplifier unit with an input circuit for connection with a source of signals and an output circuit in which the signals are amplified, a shunt circuit across the amplifier input, another shunt circuit across the amplifier output, and switch means movable into different positions to open and close both shunt circuits in timed relation with one another to short-circuit the input and output of the amplifier unit.

4. An oscillograph apparatus having an electronic tube amplifier unit connected between a signal source and the input circuit of an oscillograph, the combination with said amplifier unit of switch means, conductors connecting the switch means to the signal input circuit of the amplifier unit, conductors connecting the switch means to the amplified signal input circuit of the oscillograph, said switch means being movable into position to short circuit both the amplifier input circuit and the oscillograph input circuit simultaneously, and a motor that moves the switch means to open and close said circuits in accordance with a regular cycle.

5. Electric indicating apparatus comprising an oscillograph, an amplifier unit that supplies power to the oscillograph, shunt circuits connected across the input of both the amplifier unit and the oscillograph and effective to short circuit the input of both the amplifier and oscillograph when said shunt circuits are closed, make and break switch means connected in series with both of said shunt circuits, and an operating device that moves said switch means to open and close the shunt circuits in timed relation with one another.

6. Electric indicating apparatus comprising an oscillograph, an alternating current-amplifier unit that drives the oscillograph, said amplifier unit having a number of stages and having a blocking condenser connected in the input circuit of the first stage and another blocking condenser connected in the output circuit of the last stage, a shunt circuit connected with the input circuit ahead of the blocking condenser, another shunt circuit connected with the output circuit beyond the blocking condenser, a signal chopper comprising a vibrating reed, a contact in each of the shunt circuits in position to be touched by the reed at the same end of the stroke of the reed, said reed being connected with a return circuit so that when the reed touches the contacts of the shunt circuits, both of the shunt circuits are closed simultaneously to short-circuit the other circuits with which the shunt circuits are connected in parallel, and motor means that vibrate the reed back and forth.

7. Electric indicating apparatus comprising an oscillograph, an alternating current-amplifier unit that drives the oscillograph, said amplifier unit having a number of stages and having a blocking condenser connected in the input circuit of the first stage and another blocking condenser connected in the output circuit of the last stage, a shunt circuit connected across the input circuit ahead of the blocking condenser, another shunt circuit connected across the output circuit beyond the blocking condenser, a signal chopper comprising a vibrating reed, a first contact in position to be touched by the reed at an end of the stroke of the reed, said first contact being in the shunt circuit that connects with the input circuit, a second contact in position to be touched by the reed at an end of the stroke of the reed, said second contact being in the shunt circuit that is connected with the output circuit, a conductor connecting the reed with a return circuit so that when the reed touches the contact of either shunt circuit, that circuit is short circuited, and motor means that vibrate the reed back and forth.

GREER ELLIS.

REFERENCES CITED

The following references are of record in the file of this patent:

UNITED STATES PATENTS

| Number | Name | Date |
| --- | --- | --- |
| 1,668,748 | Whiting et al. | May 8, 1928 |
| 2,122,499 | Stocker | July 5, 1938 |
| 2,293,135 | Hallmark | Aug. 18, 1942 |
| 2,364,190 | Burgess | Dec. 5, 1944 |
| 2,439,050 | Mallory | Apr. 6, 1948 |
| 2,450,018 | Preisman | Sept. 28, 1948 |